United States Patent [19]

Burk, Jr. et al.

[11] 4,317,713

[45] Mar. 2, 1982

[54] IN SITU ALUMINUM PASSIVATION PROCESS

[75] Inventors: Emmett H. Burk, Jr., Glenwood; Jin S. Yoo, Flossmoor; John A. Karch, Chicago, all of Ill.

[73] Assignee: Atlantic Richfield Company, Philadelphia, Pa.

[21] Appl. No.: 150,862

[22] Filed: May 19, 1980

[51] Int. Cl.$^3$ .................. C10G 11/18; C10G 47/12
[52] U.S. Cl. .................. 208/113; 208/46; 208/108; 208/120; 252/412; 252/414; 252/420
[58] Field of Search .................. 208/113–124, 208/106–108, 52 CT, 46, 48 R; 252/412–415, 420

[56] References Cited

U.S. PATENT DOCUMENTS

| | | | |
|---|---|---|---|
| 2,480,627 | 8/1949 | Bodkin et al. | 252/412 |
| 2,921,018 | 1/1960 | Helmers et al. | 208/114 |
| 3,158,565 | 11/1964 | Sanford et al. | 208/120 |
| 3,324,044 | 6/1967 | Oberdorfer | 252/413 |
| 4,101,444 | 7/1978 | Burk et al. | 208/120 X |
| 4,108,795 | 8/1978 | Hemler et al. | 208/120 X |
| 4,115,249 | 9/1978 | Blanton et al. | 208/120 |
| 4,198,320 | 4/1980 | Chester et al. | 208/120 X |
| 4,289,608 | 9/1981 | McArthur | 208/120 |

*Primary Examiner*—Delbert E. Gantz
*Assistant Examiner*—G. E. Schmitkons
*Attorney, Agent, or Firm*—Stanley M. Welsh

[57] ABSTRACT

A passivation process for decreasing the poisonous effects from contamination by metals such as nickel, vanadium and/or iron that can occur during the catalytic conversion of hydrocarbon feedstocks containing such metals is disclosed. The process involves an in situ aluminum passivation for conversion catalysts containing an alumina-containing phase by means of soluble aluminum species contained in that alumina-containing phase.

6 Claims, No Drawings

IN SITU ALUMINUM PASSIVATION PROCESS

BACKGROUND OF THE INVENTION

This invention relates to a process for reducing poisonous effects of metal contaminants picked up by a hydrocarbon conversion catalyst during a hydrocarbon conversion process such as the high temperature conversion of a hydrocarbon feedstock containing such metals to a lower boiling product. More particularly, this invention relates to processes for reducing the poisonous effects of metal contaminants without removal of such contaminants from the catalyst, e.g., by a process of passivation.

During a chemical conversion promoted by a catalyst of a hydrocarbon containing metal poisons, the catalyst often becomes more and more deactivated due to the pick up of at least a portion of the metal poisons. Removal of such poisons from the catalyst may restore a substantial amount of the catalytic activity. However, no matter how carefully the process for removing the metal poisons from the catalyst is carried out, some penalty in the form of overall performance is often paid. Accordingly, a simple and straight forward method of overcoming the deleterious effects of the metal poisons or contaminants is desirable.

Catalytically promoted methods for the chemical conversion of hydrocarbons include cracking, hydrocracking, reforming, hydrodenitrogenation, hydrodesulfurization, etc. Such reactions generally are performed at elevated temperatures, for example, about 300° to 1200° F., more often 600° to 1000° F. Feedstocks to these processes comprise normally liquid or solid hydrocarbons which, at the temperature of the conversion reaction, are generally in a fluid, i.e., liquid or vapor, state and the products of the conversion usually are more valuable, lower boiling materials.

Although referred to as "metals", these catalyst contaminants or poisons may be present in the hydrocarbon feed in the form of free metals or relatively non-volatile metal compounds. It is, therefore, to be understood that the term "metal" as used herein refers to either form. Various petroleum stocks have been known to contain at least traces of many metals. For example, Middle Eastern crudes contain relatively high amounts of several metal components, while Venezuelan crudes are noteworthy for their vanadium content and are relatively low in other contaminating metals such as nickel. In addition to metals such as iron naturally present in petroleum feedstocks, petroleum stocks also have a tendency to pick up tramp iron from transportation, storage and processing equipment. Most of these metals, when present in a feedstock, deposit in a relatively non-volatile form on the catalyst during the conversion processes so that regeneration of the catalyst to remove deposited coke does not also remove these contaminants. With the increased importance of gasoline in the world today and the shortages of crude oils and increased prices, it is becoming more and more important to process all portions of a crude source, including those highly metal contaminated crudes, to more valuable products.

The present invention is particularly suitable for passivation poisons in a catalyst utilized in the catalytic cracking of reduced or top crude oil to more valuable products, such as illustrated in U.S. Pat. Nos. 3,092,568 and 3,164,542, the teachings of which are incorporated by reference herein. Similarly, this invention is applicable to processing shale oils, tar sands oils, coal oils and the like where metal contamination of the processing, e.g., cracking, catalyst can occur.

BRIEF DESCRIPTION OF THE INVENTION

It is the object of this invention to improve the performance of a hydrocarbon conversion catalyst and to provide a simple and straight forward process for reducing the poisonous effects on a chemical conversion catalyst due to metal contaminants present in a hydrocarbon feedstock.

It is an object of this invention to reduce the poisonous effects of metal contaminants on a chemical conversion catalyst by means of an in situ aluminum passivation process.

Other objects of this invention will be clear based upon this disclosure.

An alternative to letting the unpassivate metals level of a conversion catalyst increase and activity and desired selectivity decrease is to diminish the overall unpassivated metal content on the catalyst either by demetallization processes or by raising catalyst replacement rates. Letting unpassivated metals level increase, or increasing catalyst replace rates are balanced against product value and operating costs to determine the most economic way of operating. The optimum unpassivated metals level at which to operate any cracking unit will be a function of many factors including feedstock metal content, type and cost of catalyst, overall refinery balance, etc., and can be determined by a comprehensive study of the refinery's operations. With the high cost of both catalyst and the hydrocarbon feedstock today, it is increasingly disadvantageous to discard catalyst or convert hydrocarbon feedstocks to coke or gas.

It has been discovered that an in situ aluminum passivation process can be very effective in reducing the deleterious effects of metal contaminants on a conversion catalyst and thereby to restore to a remarkable degree the catalytic activities of such a treated conversion catalyst.

A unique aspect of this in situ process in part resides in the utilization of aluminum species dissolved from the metal contaminated catalyst itself to act as a passivating agent. Although a portion of the catalyst is solubilized in this process, the physical and catalytic properties of the catalyst may remain substantially unaffected. The amount of aluminum solubilized from the alumina-containing phase of a catalyst must, however, be controlled in order not to adversely affect physical and catalytic properties. We have found that it is possible to dissolve a sufficient portion of the aluminum contained in the alumina-containing phase of the catalyst to provide beneficial passivation of metal contaminants without adversely affecting, to any substantial degree, physical and catalytic properties of such a catalyst. We have further found that the number of aluminum atoms in the treating medium which must be transferred to the metal-contaminated catalyst is determined by the atomic ratio of such aluminum atoms to the total number of atoms of metal contaminants on the catalyst to be passivated.

We have found that the atomic ratio, i.e., the number of atoms of one specie of atoms, e.g., aluminum atoms, to that of another specie or species of atoms, e.g., atoms of metal contaminants to be passivated, is preferably in the range of about 0.1:1 to about 3:1 and more preferably in the range of about 0.2:1 to about 1:1. We have further found that removal of metal contaminants need not occur in this in situ process in order to achieve desired passivation benefits.

In general, removal of metal contaminants concurrently with dissolution of aluminum species from the catalyst requires such extensive dissolution of such aluminum species that the physical and catalytic properties of the catalyst are eventually adversely affected. Therefore, there is generally no substantial reduction in the amount of metal contaminants occurring in the in situ process of this invention, except for some vanadium removal that occurs prior to and after the dissolution of aluminum species from the alumina-containing phase. In general, no more than 25% of the vanadium present as a contaminant in the catalyst is removed by a process of this invention.

Broadly, this invention is an improvement to a conventional conversion process. A conventional conversion process involves contacting a hydrocarbon feedstock in a reaction zone at hydrocarbon conversion conditions with a catalyst to form a conversion product and a deactivated catalyst which has carbonaceous deposits and which containing at least a portion of the metal contaminants originally present in the hydrocarbon feedstock. The deactivated catalyst is typically regenerated to restore at least a portion of its catalytic activity by removing under controlled conditions at least a portion of said carbonaceous deposits to form a regenerated catalyst.

Solid oxide catalysts have long been recognized as useful in catalytically promoting the conversion of hydrocarbons. For hydrocarbon cracking processes carried out in the substantial absence of added free molecular hydrogen, suitable catalysts which are usually activated or calcined, are predominantly silica or silica-based, e.g., silica-alumina, silica-magnesia, silica-zirconia, etc., compositions in a state of slight hydration containing small amounts of acidic oxide promoters in many instances. The oxide catalyst may contain a substantial amount of a gel or gelatinous precipitate comprising a major portion of silica and at least one other inorganic oxide material, such as alumina, zirconia, etc. These oxides may also contain small amounts of other inorganic materials. The use of wholly or partially synthetic gel or gelatinous catalyst, which are uniform and little damaged by high temperatures in treatment and regenerating, is often preferable.

Also suitable are hydrocarbon cracking catalysts which include a catalytically effective amount of at least one natural or synthetic zeolite, e.g., crystalline alumino silicate. A preferred catalyst is one that includes at least one zeolite to provide a high activity catalyst. Suitable amounts of zeolite in the catalyst are in the range of about 1–75% by weight. Preferred are zeolite amounts of about 2–30% by weight of the total catalyst. Catalysts which can withstand the conditions of both hydrocarbon cracking and catalyst regenerating are suitable for use in the process of this invention. For example, a phosphate silica-alumina silicate composition is shown in U.S. Pat. No. 3,867,279, chrysolite catalysts are shown in U.S. Pat. No. 3,868,316, zeolite beta type of catalyst is shown in U.S. Pat. No. Re. 28,341. The catalyst may be only partially of synthetic material; for example, it may be made by the precipitation of silica-alumina on clay, such as kaolinite or halloysite. One such semi-synthetic catalyst contains about equal amounts of silica-alumina gel and clay.

The manufacture of synthetic gel catalyst is conventional, well known in the art and can be performed, for instance (1) by impregnating silica with aluminia salts; (2) by direct combination of precipitated (or gelated) hydrated alumina and silica in appropriate proportions; or (3) by joint precipitation of alumina and silica from an aqueous solution of aluminum and silicon salts. Synthetic catalyst may be produced by a combination of hydrated silica with other hydrate bases as, for instance, zirconia, etc. These synthetic gel-type catalyst may be activated or calcined before use.

A particularly preferred catalyst contains a catalytically effective amount of a decationized zeolitic molecular sieve having less than 90% of the aluminum atoms associated with cations, a crystalline structure capable of internally absorbing benzene and a $SiO_2$ to $Al_2O_3$ molar ratio greater than 3. Such catalysts are illustrated in U.S. Pat. No. 3,236,761, the teachings of which are incorporated by reference herein.

An example of a conversion process is cracking of hydrocarbon feedstocks to produce hydrocarbons of preferred octane rating boiling in the gasoline range. A variety of solid oxide catalysts is widely used to give end products of fairly uniform composition. Cracking is ordinarily effected to produce gasoline as the most valuable product and is generally conducted at temperatures of 750° to 1100° F., preferably about 850° to 950° F., at pressures up to about 200 psig, preferably about atmospheric to 100 psig and without substantial addition of free hydrogen to the system. In cracking, the feedstock is usually a petroleum hydrocarbon fraction such as straight run or recycle gas oils or other normally liquid hydrocarbons boiling above the gasoline range. Recently, low severity cracking conditions have been employed for heavily contaminated feedstocks such as crude or reduced crude where the conversion is not made directly to the more valuable, lower boiling products, i.e., gasoline boiling range products, but to intermediate type hydrocarbon conversion products which may be later refined to the more desirable, lower boiling, gasoline or fuel oil fractions. High severity cracking has also been practiced for the conversion of such feedstocks to light, normally gaseous hydrocarbons, such as ethane, propane or butane.

An example of a regeneration procedure is one wherein the catalyst is contacted periodically with free oxygen-containing gas in order to restore or maintain the activity of the catalyst by removing at least a portion of the carbonaceous deposits from the catalyst which form during hydrocarbon conversion. However, in those processes not having a regeneration step, the catalyst can be subjected to a regenerating step after the removal of the catalyst from the process. It will be understood that "regeneration" involves a carbonaceous material burn-off procedure. Ordinarily, the catalysts are taken from the hydrocarbon conversion system and treated before the poisoning metals have reached an undesirably high level, for instance, above about 0.5% by weight, on a catalyst and preferably less than about 10% by weight maximum, content of nickel, iron and vanadium. More preferably, the catalyst is removed when the nickel, iron and vanadium content is less than about 5% by weight and most preferably when the catalyst contains about 0.75% to about 2% by weight nickel, iron and vanadium. Generally speaking, when the hydrocarbon conversion levels, i.e., more than about 50% by volume (of the feedstock) conversion, the amount of metals tolerated on the catalyst is less. On the other hand, low conversion levels, i.e., less than about 50% by volume conversion, tolerate higher amounts of metals on the catalyst.

The actual time or extent of the regeneration thus depends on various factors and is dependent on, for example, the extent of metals content in the feed, the level of conversion, unit tolerance for poison, the sensitivity of the particular catalyst toward the passivation procedure used to reduce the poisonous effects of metal upon the catalyst, etc.

Regeneration of a hydrocarbon cracking catalyst to remove carbonaceous deposit material is conventional and well known in the art. For example, in a typical fluidized bed cracking unit, a portion of catalyst is continually being removed from the reactor and sent to the regenerator for contact with an oxygen-containing gas at about 950° to about 1350° F., preferably about 1000° to about 1250° F. Combustion of carbonaceous deposits from the catalyst is rapid, and for reasons of economy, air is used to supply the needed oxygen. Average residence time for a catalyst particle in the regenerator can be on the order of about three to one hundred minutes, preferably about three minutes to sixty minutes and the oxygen content of the effluent gases from the regenerator is desirably less than about 0.5 weight percent. When later oxygen treatment is employed, the regeneration of any particular quantity of catalyst is generally regulated to give a carbon content on the catalyst of less than about 0.5 weight percent. At least a portion of the regenerated catalyst is then returned to the reaction zone.

The improved process of this invention comprises additional processing steps over that employed in a conventional conversion process. The additional process steps involve contacting at least a portion of a regenerated catalyst with a medium capable of causing at least a passivating amount of the soluble aluminum species in an alumina-containing phase of the catalyst to transfer from the alumina-containing phase in the catalyst to the medium and then causing at least a portion of the amount of the soluble aluminum species present in the medium to transfer from the medium back to the catalyst, whereby the metal contaminants on the catalyst are passivated and, to a remarkable degree, the physical and catalytic properties of the catalyst are restored. An example of a medium capable of causing at least a portion of the aluminum in the alumina-containing phase in the catalyst to transfer from the catalyst to the medium is an aqueous medium having a hydrogen ion concentration that causes at least a portion of the soluble aluminum species to transfer from the alumina-containing phase in the catalyst to the aqueous medium. Such soluble aluminum species in the aqueous medium are induced to transfer from the aqueous medium back to the catalyst by adjusting the pH of the aqueous medium to a value which results in at least a portion of the soluble aluminum species in the aqueous phase to transfer from the aqueous phase back to the catalyst.

We have found that a particularly advantageous medium for causing aluminum species to transfer from the alumina-containing phase on the catalyst to the aqueous phase is an aqueous solution containing a sufficient amount of sulfur dioxide to provide a hydrogen ion concentration that causes the soluble aluminum species to transfer from the alumina-containing phase on the catalyst. To cause at least a portion of the solubilized aluminum species in the aqueous phase to transfer back to the catalyst, all one need do is change the concentration of $SO_2$ in the aqueous phase and thereby to change the pH value of the aqueous phase. A change in pH for example from between about 1 to 3, and preferably about 1 to about 2.5, to between about 5 to 8, and preferably about 5 to about 7.8 results in a transfer of at least a portion of the soluble alumina to transfer from the aqueous phase to the catalyst.

A passivating amount of soluble aluminum species transferred to and from a catalyst during a process of this invention is dependent upon the number of atoms of metal contaminants to be passivated on the catalyst. The atomic ratio of all aluminum atoms of the soluble aluminum species transferred to all atoms of the metal contaminants is preferably in the range of about 0.1:1 to about 3:1 and more preferably in the range of about 0.2:1 to about 1:1. At least fifty percent and preferably at least eighty percent of those aluminum atoms initially transferred from a soluble aluminum-containing phase of the catalyst to a liquid medium are transferred back to the catalyst from the liquid medium.

Examples of processing conditions useful in carrying out a process of this invention are set out hereinafter. Contacting times between a catalyst and a liquid medium for aqueous media are generally in the range of from about half a second to about twenty minutes and preferably in the range of from about two minutes to about ten minutes. Contacting times for an organic medium is about the same as for an aqueous medium, but often depends upon the rate at which the organic medium can be evaporated off, and hence does not have a simply definable contacting time. The temperature of the contacting medium, e.g., organic and aqueous media, can be any where from about ambient or room temperature (72° F.) to the boiling point of the contacting medium. Temperature is not critical and may, in fact, be below room temperature, but we have found no reason for cooling in order to obtain the benefits from a process of this invention.

Optionally, oxidative washes and reductive washes such as disclosed in U.S. Pat. No. 4,101,444 (1978), the teachings of which are incorporated by reference herein, can be used.

A suitable calcining temperature for an in situ aluminum treated catalyst of this invention is generally in the range of about 900° to about 1450° F., and more preferably in the range of about 950° to 1250° F. One limitation on the temperature for calcination is due to the fact that the catalyst must not be adversely affected by heating.

The following example is intended to be illustrative of the invention of this disclosure. However, many variations based on the teachings of this disclosure are readily apparent to one skilled in the art and are intended to be within the scope of this invention. The examples should not be used to unnecessarily restrict the nature on the scope of this invention.

EXAMPLE I

A Phillips Borger equilibrium silica-alumina zeolite-containing catalyst was used. This catalyst included about 5% by weight of a crystalline aluminum silicate effective to promote hydrocarbon cracking having an initial catalytic activity as follows:

|  | Catalytic Activity | | |
|---|---|---|---|
|  | MA | CRP | $H_2/CH_4$ |
| Original Catalyst | 80 | 0.75 | 8 |

The catalyst was used in a fluid catalytic cracking conversion of a hydrocarbon feedstock containing iron, nickel, copper and vanadium. The contaminated catalyst was removed from the hydrocarbon conversion stream and regenerated to remove carbon under conventional conditions, so as to have less than about 0.5% by weight of carbon. The regenerated catalyst had a catalytic activity, surface area in meters squared per gram, and a metal contamination shown in the TABLE hereinafter as entry 1.

EXAMPLE II

The same Phillips Borger equilibrium catalyst was treated with a fresh aluminum compound by dissolving alumina from the equilibrium catalyst with an aqueous solution of $SO_2$. 20% catalyst slurry was agitated in an $SO_2$ solution at 50° F. for 15 minutes to ensure some alumina was solubilized from the catalyst matrix. A turbid system resulted. The resulting system was allowed to reflux to remove excess $SO_2$ dissolved in the system, and to allow the solubilized aluminum compound to redeposit back on the catalyst through hydrodecomposition. This was continued for about 60 minutes until the relatively clear supernatant liquid resulted. The catalyst was separated from the aqueous phase by filtration and the results of the previous processing is listed as entry 2 of the following TABLE. The catalyst was washed with an aqueous solution of $H_2O_2$ twice (20#$H_2O_2$/ton catalyst) at 150° F. for 4 minutes. The results are listed as entry 3 of the following TABLE.

TABLE

|  | % Metal Contaminants | | | | Catalyst Activity | | | Total | Zeolite | *Area in Meters Squared Per Gram |
|---|---|---|---|---|---|---|---|---|---|---|
|  | Ni | Fe | V | Ce | MA | CPF | $H_2/CH_4$ | | | |
| 1. | 0.33 | 0.72 | 0.71 | 0.10 | 59.1 | 3.01 | 20.2 | 99 | 22 | |
| 2. |  |  |  |  | 73.9 | 1.45 | 10.22 | | | |
| 3. | 0.33 | 0.71 | 0.52 | 0.10 | 73.9 | 1.56 | 6.66 | 97 | 23 | |

*The total area was determined following ASTM D 3663 (1978) which involves an adsorption-desorption as in the BET method. The area attributable to zeolite is determined following a procedure disclosed by M.F.L. Johnson in the Journal of Catalysis, 1978, V. 52, p. 425.

The embodiments of this invention in which an exclusive property or privilege is claimed are defined as follows:

1. In a process for converting a hydrocarbon material having at least one metal contaminant selected from the group consisting of nickel, vanadium, iron and copper which comprises contacting the hydrocarbon material in a reaction zone at hydrocarbon conversion conditions with a catalyst comprising a phase of soluble aluminum species to form a conversion product and a deactivated catalyst having carbonaceous deposits and containing at least a portion of said metal contaminants, and regenerating said deactivated catalyst to restore at least a portion of its catalytic activity by removing at least a portion of said carbonaceous deposits to form a regenerated catalyst, the improvement which comprises: contacting said regenerated catalyst with a medium for a time and at a temperature so as to cause at least a passivating amount of said soluble aluminum species to transfer from said phase to said medium and then causing at least a portion of said amount of said soluble aluminum species to transfer from said medium back to said catalyst, whereby the deleterious effects of said at least one metal contaminant on said catalyst are reduced.

2. In the process of claim 1, said medium capable of causing at least a passivating amount of said soluble aluminum species to transfer from said phase to said medium is an aqueous medium having a hydrogen ion concentration that causes said soluble aluminum species to transfer from said phase to said aqueous medium and said causing at least a portion of said amount of said soluble aluminum species to transfer from said aqueous medium back to said catalyst is carried out by adjusting the pH of said aqueous medium to a value which results in at least a portion of said amount of said soluble aluminum species to transfer from said aqueous medium back to said catalyst.

3. In the process of claim 1, said medium capable of causing at least a passivating amount of said soluble aluminum species from said phase to transfer to said medium is an aqueous solution containing a sufficient amount of dissolved sulfur dioxide to have a hydrogen ion concentration that causes said soluble aluminum species to transfer from said phase in said catalyst to said aqueous solution and said causing at least a portion of said amount of said soluble aluminum species to transfer from said medium back to said catalyst comprises changing the concentration of $SO_2$ in said aqueous solution so as to change the pH value of said aqueous solution to a value which results in a transfer of at least a portion of said amount of said soluble aluminum species to transfer from said aqueous solution back to said catalyst.

4. The process of claims 2 or 3, wherein the hydrogen ion concentration is definable in terms of a pH change from between about 1.0 to about 2.5, which causes said soluble aluminum species to transfer from said phase to said aqueous medium, to between about 5.0 to about 7.8, which causes said soluble aluminum species to transfer from said aqueous phase back to said catalyst.

5. The process of claims 1, 2 or 3 wherein said amount of said soluble aluminum species is determined by an atomic ratio of the number of all aluminum atoms of said soluble aluminum species to all atoms of said at least one metal contaminant and wherein said atomic ratio is in the range of about 0.1:1 to about 3:1.

6. The process of claim 1 wherein the process for converting a hydrocarbon material comprises cracking of said hydrocarbon material.

* * * * *